US008278772B2

(12) United States Patent
Labrunie

(10) Patent No.: US 8,278,772 B2
(45) Date of Patent: Oct. 2, 2012

(54) RECOVERY OF POTENTIAL ENERGY FROM THE APRON OF A ROLLER BLIND

(75) Inventor: Antoine Labrunie, Paris (FR)

(73) Assignees: Bubendorff, Societe Anonyme, Attenschwiller (FR); Commissariat a l'Energie Atomique, Etablissement Public, Paris (FR)

( * ) Notice: Subject to any disclaimer, the term of this patent is extended or adjusted under 35 U.S.C. 154(b) by 361 days.

(21) Appl. No.: 12/672,750

(22) PCT Filed: Aug. 5, 2008

(86) PCT No.: PCT/FR2008/051461
§ 371 (c)(1),
(2), (4) Date: Feb. 9, 2010

(87) PCT Pub. No.: WO2009/022079
PCT Pub. Date: Feb. 19, 2009

(65) Prior Publication Data
US 2011/0031764 A1  Feb. 10, 2011

(30) Foreign Application Priority Data

Aug. 9, 2007 (FR) ...................................... 07 57007

(51) Int. Cl.
*F02B 63/04* (2006.01)
*F03G 7/08* (2006.01)
*H02K 7/18* (2006.01)

(52) U.S. Cl. ...................................................... 290/1 R
(58) Field of Classification Search .................. 290/1 R
See application file for complete search history.

(56) References Cited

U.S. PATENT DOCUMENTS 8,044,626 B2 * 10/2011 Adamus et al. ............... 318/446
2008/0278111 A1 * 11/2008 Genies et al. .................. 320/101

OTHER PUBLICATIONS

International Search Report of PCT/FR2008/051461, mailing date of Mar. 18, 2009.

* cited by examiner

*Primary Examiner* — Javaid Nasri
(74) *Attorney, Agent, or Firm* — Westerman, Hattori, Daniels & Adrian, LLP

(57) ABSTRACT

The method of recovering the potential energy from the apron of a roller blind including a driving motor connected to an autonomous energy supply during the expansion or retraction phase of the apron, during the expansion or retraction phase of the apron, by determining an energy recovery phase corresponding to a motor torque applied by the apron on the driving, which allows energy recovery without damaging the components of the blinds. A roller blind for implementing the method recovers energy corresponding to the motor torque exerted by the apron by measuring and storing at least one parameter related to the conditions of operation of the autonomous supply as well as the delivered level of energy, comparing it with a threshold value, and adjusting the unwinding and winding-up speed of the apron.

20 Claims, 1 Drawing Sheet

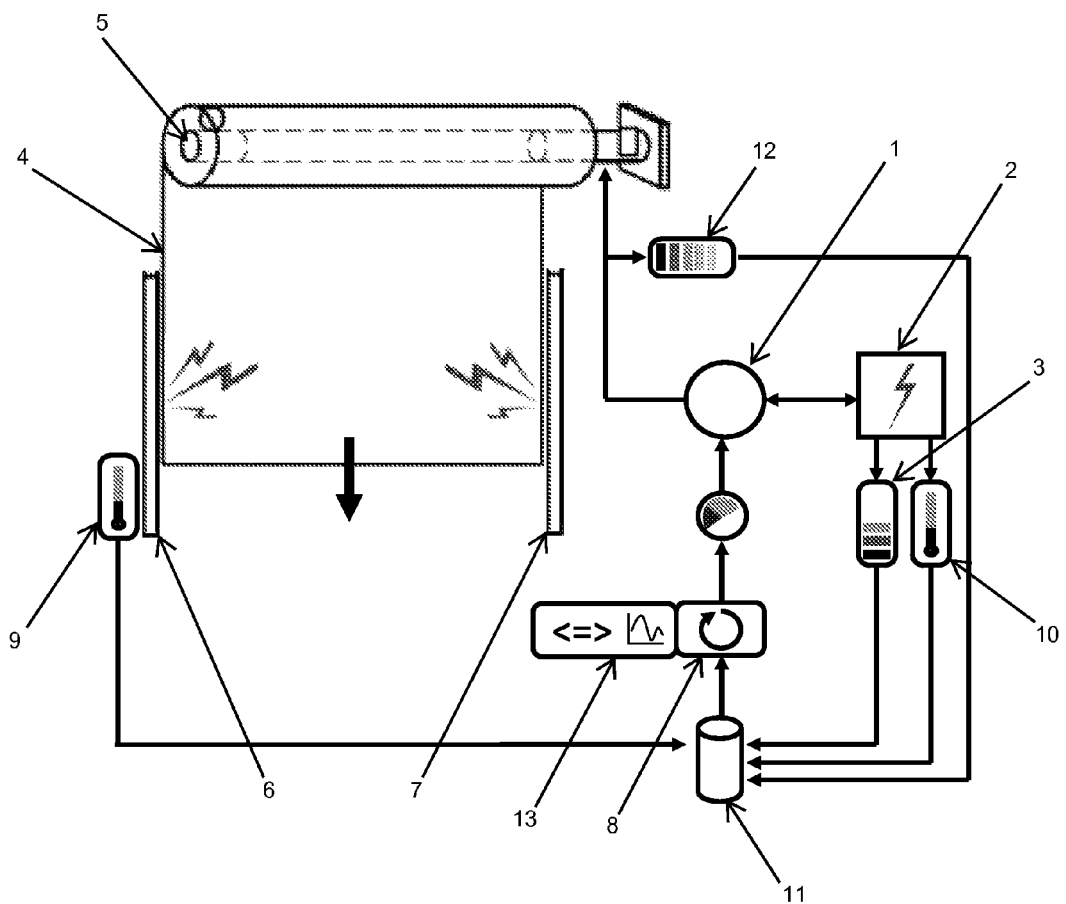

RECOVERY OF POTENTIAL ENERGY FROM THE APRON OF A ROLLER BLIND

FIELD OF THE INVENTION

This invention is related to the field of the roller blinds, namely of roller blinds autonomously supplied with current.

BACKGROUND ART

Such a roller blind comprises an apron formed of hinged blades the side ends of which slide internally along side grooves when the apron passes from an unfolded position into a position of winding-up around a shaft, and vice-versa, under the action of motorization means.

Within the framework of this invention, said motorization is autonomously supplied with current through batteries. In addition, the latter can be designed rechargeable in the form of accumulators. Their recharging can namely occur through a sensor for converting renewable energy, such as a photovoltaic sensor converting solar energy, a wind dynamo or the like.

The major difficulties of an autonomously supplied device reside in optimizing its operation time while preserving a high reliability. Within the framework of a roller blind according to the invention, the autonomy should be as large as possible, so that the user can actuate said blind when he wishes so, irrespective of the weather conditions. Nevertheless, improving the autonomy, for example through energy saving, should not occur to the detriment of the operation of said blind. Its use indeed requires a reasonable time of displacement of the blind and, hence, a suitable unfolding and winding-up speed.

Within this specific framework of the invention, it has been devised to recover the potential energy of gravity from the blind during its sliding from the wound-up position into the unfolded position. The conversion of this energy permits to recharge the batteries and considerably improves the autonomy of the roller blind.

During this unfolding of the roller-blind apron, several phases are present, a first phase requiring driving the roller blind in order to push back the slats of the apron into the lateral guiding grooves. This first phase is followed by a second phase in which the weight of the apron already inserted into the side grooves becomes large enough to ensure the driving and, hence, the unfolding of the roller blind; during this second phase, the motor acts more as braking means, so as to limit the downward-travel speed of the apron and to avoid the risks of accident as well as the impact when the apron comes to a stop at the lower end of these side grooves. At that time follows a third phase in which the pulling force exerted by the apron onto the winding-up shaft progressively tends to diminish, corresponding to the piling up of the slats of said apron above each other.

It should be noted in this respect that said slats are often movable with respect to each other in a direction perpendicular to their longitudinal axis, in order to impart to the roller blind, as the case may be, an openwork or a fully closed position. Indeed, in a position spread apart from each other, these slats leave openings favouring the passing through of light and ensure some ventilation.

During this third phase the motor can progressively pass from a braking function to once again a driving function, depending on the hanging weight of the apron and the frictions the latter is subjected to.

The energy recovery can occur when the motor ensures a braking function. However, one easily understands that the pulling force exerted by the apron constantly changes. This also applies to the braking power. Therefore, the recoverable power is in turn highly varying.

SUMMARY OF THE INVENTION

It has been noticed that this power, when it exceeds a certain threshold, can be destructive for the accumulator itself or for the electronic and electric components ensuring its recharging.

It has been noticed furthermore that this destructive power threshold depended on weather parameters, in particular on the outer temperature and on that of the environment of the components. In particular, the conditions of operation change for some types of batteries or electric and electronic components subjected, as the case may be, to low or high temperatures. For example, a lithium battery recharged at low temperatures can be damaged during a too high or too sudden supply of recharging energy. Likewise, some electronic and electric components subjected to high temperatures, through heating due to a too strong current, are likely to be damaged.

The recovered power is advantageously controlled taking into consideration the various components of the roller blind while ensuring an optimized operation of the latter.

To this end, this invention relates to a method for recovering the potential energy from an apron of a roller blind including driving means provided with a motor connected to autonomous supply means during the unwinding or winding-up phase of the apron.

Such a method is characterised in that during the unwinding or winding-up phase of the apron is determined a phase of energy recovery corresponding to a motor torque exerted by the apron on said driving means.

According to other features, during this energy recovery phase, the motor is controlled to operate as a generator; a threshold value of recoverable power is determined depending on at least one parameter related to the operating conditions of the autonomous supply means; the level of the power delivered by the motor operating as a generator is measured and compared to said threshold value; the unwinding and winding-up speed of the apron is adjusted in order to maintain the level of power delivered lower than or equal to said threshold value.

In addition, during the energy recovery phase, at least one of said parameters is periodically controlled and a new threshold value is determined in order to periodically adjust the unwinding and winding-up speed of the apron according to this new value.

The invention is also related to the device for implementing such a method.

Further features and advantages of the invention will become clear from the following detailed description of the non-restrictive embodiments of the invention.

BRIEF DESCRIPTION OF THE DRAWINGS

FIG. 1 is a general schematic view of a non-restrictive embodiment of a roller blind according to the invention.

DETAILED DESCRIPTION OF THE INVENTION

This invention relates to improving the autonomy of an autonomously supplied roller blind.

As illustrated on FIG. 1, such a roller blind comprises driving means provided with a motor 1 connected to autonomous supply means. The latter comprise in addition a battery 2. This battery is preferably designed rechargeable, in the form of an accumulator, such as a lithium battery or the like. In addition, means are connected to said battery so as to recharge it electrically, preferably by capturing a renewable energy, such as solar energy or wind, then by converting the energy into electric current.

In this respect, such conversion and recharging means are capable of recharging the battery depending on its level of charging. Means can be provided for measuring this level of charging. These can be for example sensors such as sensor 3 for measuring the voltage at the terminals of said battery in order to permit or not its recharging. A charge limit is previously determined depending on the characteristics of the battery and corresponds, in our example, to a voltage threshold avoiding any damage to these electric-energy storage elements.

Thus, the blind comprises at least one sensor, in the form of a photovoltaic sensor, a wind dynamo or the like. In addition, the invention comprises means for converting the so captured energy connected to said battery in order to permit its recharging.

The autonomous supply means is capable of driving an apron 4 from a position wound up around a shaft 5 to an unwound position, and vice-versa. To this end, the apron slides along lateral grooves 6, 7, generally arranged on the splay reveals of a door or window to be closed by means of said apron. An advantage of this invention consists in converting the potential energy of the unwinding of the apron into electric energy for recharging said batteries.

To this end, the invention relates to the recovery of the potential energy of gravity from the apron in the unwinding and winding-up phase of the latter.

In particular, but non-restrictively, the invention relates to a vertically unfolding roller blind and is aimed at recovering potential energy developed by the increasing weight of the apron as it travels downward, when passing from the wound-up position to the unwound position, or vice-versa.

In brief, the mechanical energy generated by the descending weight of the apron is partially recovered in order to be converted into electric energy, then stored within said battery in the form of electrochemical energy. This energy can afterwards be reused for winding up the apron or for initialising a future downward travel.

As evoked above, during the unwinding or winding-up phase of the apron is determined an energy recovery phase corresponding to a motor torque exerted by the apron onto said driving means.

During this energy recovery phase, the weight of the apron is enough to drive it and it is no longer necessary to supply energy through the driving means. That is why it has been devised to provide the autonomous supply means with reversible electronic power-converting means. In other words, the battery can supply current to the driving means, but the latter as well as the motor can also operate as a generator and thus feed the battery for its recharging.

In general, the recovered power continuously varies depending on the hanging weight of the apron as it travels downward. Furthermore, the frictions, namely the viscous frictions, depend on the downward-travel speed of the apron of the blind. Therefore, the downward-travel speed of the latter has an influence on the convertible energy. It is therefore appropriate to control the change in downward-travel speed of the apron, in order to recover an optimal quantity of energy.

Nevertheless, the recovered power should neither be prejudicial to the operation of the roller blind nor damage its components. If the energy remains relatively low, the power the apron can supply during its downward travel is indeed not insignificant for its conversion for recharging said battery.

That is why a limitation of the downward-travel speed of the apron is performed depending on the internal and external parameters of the roller blind.

That is why the invention comprises means for controlling the speed of unfolding of the apron depending on the various external and internal factors of said roller blind. A computation unit, such as a processor 8, interprets these data in real time in order to control the driving means and to thus have an influence on the downward-travel speed of the apron.

In particular, the speed of unfolding is controlled mainly, but non-restrictively, with respect to at least one parameter related to the conditions of operation of the autonomous supply means.

To this end, a threshold value for recoverable power is determined depending on at least one parameter. In particular, several parameters can be measured and stored, in order to calculate said threshold value.

One parameter taken into consideration corresponds to the room temperature reigning within said roller blind. In particular, the temperature of the electric and electronic components of the supply means. Indeed, if the temperature is very low or very high, the components and the battery can be damaged under the action of an important and sometimes quick change of the current and the heat dissipation, thus limiting the more the life time of said elements. For example, a lithium battery does not withstand very well low temperatures and sudden heating. The temperature of the components as well as the room temperature should therefore be controlled, as illustrated by sensors 9, 10.

Another parameter to be taken into consideration alone or in addition corresponds to measuring the state of charge of the autonomous supply means. This state of charge can for example be measured by following the voltage at the terminals of a battery. As evoked above, it is necessary to control, through the battery recharging means, the state of charge of the latter as well as the quantity of energy and the power supplied to same, in order not to damage it.

Each parameter is stored as illustrated by memory 11 in order to be compared and/or to serve for calculating the threshold value for power recovery. Once this value has been fixed, the level of power delivered by the motor operating as a generator is measured at illustrated at 12 and it is compared to said threshold value as illustrated at 13. The unwinding and winding-up speed of the apron is adjusted so as to maintain the level of power delivered lower than or equal to the threshold value.

More specifically, during the energy recovery phase, at least one of said parameters is periodically controlled and a new threshold value is determined in order to periodically adjust the unwinding and winding-up speed of the apron according to this new value.

To this end, means are capable of measuring said parameters and of storing the measured values. This also applies to the recoverable power. Adequate sensors such as sensors 9, 10 can be arranged inside the electric and electronic components, inside the roller blind as well as outside the latter. In a similar way are positioned means for measuring the state of charge of the battery, for example means for measuring the voltage of the battery.

The results of these measurements are then stored in the memory 11 in order to be used by the processor 8 calculating said threshold value.

Once the latter has been determined, means 13 are capable of comparing it with the level of power. The intersection of these data is compared with charts with graduation and correspondence, in order to optimise the downward-travel speed of the apron.

This optimisation occurs according to display boards of the extreme downward-travel speed of the apron depending on a given temperature or on the state of charge of the battery. Curves corresponding to the time between two so-called <<non-destructive>> breakdowns are thus obtained.

In brief, in the case of low or high temperature, the downward-travel speed of the apron should be limited, in order to avoid any damage to the electronic components and to the battery. In addition, as the components are heating, the downward-travel speed can have to change, in order to get close to the extreme values with a view to a longer life time, while maintaining an adequate operation speed.

In particular, the downward-travel speed of the apron of the roller blind changes within a time interval. Thus, a maximum downward-travel speed of the apron corresponds to the upper limit of said time interval and is determined depending on the highest speed the mechanics of a roller blind allows without undergoing any damage. Similarly, a minimum downward-travel speed of the apron corresponds to the lower limit of said time interval and is determined so as to limit the duration of closing, so that the time of winding-up and unwinding of the apron remains reasonable for the user.

It should be noted that in order to increase the converted potential energy, the frictions within the device according to the invention, for example at the level of the side grooves in which the apron slides, as well as within the motor should be limited at much as possible. The sum of the friction forces exerted on the apron should be clearly lower than the weight of the hanging portion of the latter. The energy recovered by the invention is therefore the larger as the losses are minimised.

In addition, in order to limit the damage of the elements the roller blind according to the invention is comprised of, in particular the electronic components and the battery, they should be protected, namely in order to maintain a uniform temperature or to avoid too low or too high temperatures.

The invention claimed is:

1. Method for recovering a potential energy of gravity from an apron of a roller blind including driving means provided with a motor connected to autonomous supply means during an unwinding or winding-up phase of said apron, wherein:
   during the unwinding or winding-up phase of the apron is determined a phase of energy recovery corresponding to a motor torque exerted by the apron on said driving means.

2. Method according to claim 1, wherein:
   during the energy recovery phase, the motor is controlled to operate as a generator;
   a threshold value of recoverable energy is determined depending on at least one parameter related to operating conditions of the autonomous supply means;
   a level of energy delivered by the motor operating as a generator is measured and compared to said threshold value;
   the unwinding and winding-up speed of the apron is adjusted in order to maintain the level of energy delivered lower than or equal to said threshold value.

3. Method according to claim 2, wherein during the energy recovery phase, at least one of said parameters is periodically controlled and a new threshold value is determined in order to periodically adjust the unwinding and winding-up speed of the apron according to the new threshold value.

4. Method according to claim 3, wherein at least one parameter corresponds to measuring a state of charge of the autonomous supply means, namely a voltage at terminals of a battery.

5. Method according to claim 3, wherein at least one parameter corresponds to a temperature of electric and electronic components of said autonomous supply means.

6. Method according to claim 3, wherein at least one parameter corresponds to a temperature of a room in which the roller blind is located.

7. Method according to claim 2, wherein at least one parameter corresponds to measuring a state of charge of the autonomous supply means, namely a voltage at terminals of a battery.

8. Method according to claim 7, wherein at least one parameter corresponds to a temperature of electric and electronic components of said autonomous supply means.

9. Method according to claim 7, wherein at least one parameter corresponds to a temperature of a room in which the roller blind is located.

10. Method according to claim 2, wherein at least one parameter corresponds to a temperature of electric and electronic components of said autonomous supply means.

11. Method according to claim 10, wherein at least one parameter corresponds to a temperature of a room in which the roller blind is located.

12. Method according to claim 2, wherein at least one parameter corresponds to a temperature of a room in which the roller blind is located.

13. Roller blind for implementing the method according to claim 1, comprising an apron and driving means provided with a motor connected to autonomous supply means as well as means for recovering energy corresponding to a motor torque exerted by said apron onto said driving means, wherein said recovering means comprise:
    means for measuring and (i) at least one parameter related to conditions of operation of the autonomous supply means and (ii) a delivered level of energy;
    means for comparing said level of energy with a threshold value determined according to said parameter; and
    means for adjusting an unwinding and winding-up speed of said apron.

14. Roller blind according to claim 13, wherein said measuring means comprise means for measuring a temperature of electric and electronic components of the autonomous supply means.

15. Roller blind according to claim 14, wherein said measuring means comprise means for measuring a state of charge of the autonomous supply means, namely a voltage at terminals of a battery.

16. Roller blind according to claim 15, wherein said measuring means comprise means for measuring a temperature of a room in which the roller blind is located.

17. Roller blind according to claim 14, wherein said measuring means comprise means for measuring a temperature of a room in which the roller blind is located.

18. Roller blind according to claim 13, wherein said measuring means comprise means for measuring a state of charge of the autonomous supply means, namely a voltage at terminals of a battery.

19. Roller blind according to claim 18, wherein said measuring means comprise means for measuring a temperature of a room in which the roller blind is located.

20. Roller blind according to claim 13, wherein said measuring means comprise means for measuring a temperature of a room in which the roller blind is located.

* * * * *